United States Patent Office 3,575,957
Patented Apr. 20, 1971

3,575,957
METHOD FOR IMPROVING THE DRY STATE TINCTORIAL STRENGTH OF A WATER-SOLUBLE DYE
Walter R. Demler, Hamburg, Percy Perletz, Kenmore, and James R. Price, Amherst, N.Y., assignors to Allied Chemical Corporation, New York, N.Y.
No Drawing. Filed Aug. 21, 1967, Ser. No. 661,831
Int. Cl. C07c *107/60;* C09b *29/38, 43/00*
U.S. Cl. 260—163
15 Claims

ABSTRACT OF THE DISCLOSURE

The method involves intimately contacting a water soluble dye with an inert, water soluble, low boiling organic solvent and then evaporating the solvent. The treatment may be applied to dye which is in substantially dry, granular form and to dye in the form of an aqueous mixture. Dyes treated in this manner have greatly improved tinctorial strength in the dry state and therefore this process is particularly useful for dyes which are used to color dye mixes.

---

This invention relates to a method of preparing water soluble dyes having a high tinctorial value in the dry state.

Dyes and pigments are commonly used to enhance the esthetic appeal of various dry mixes, such as granulated and powdered food, cosmetic, drug and cleaning compositions. Food mixes, in particular, which are marketed as dry mixes are frequently colored with edible dyes to improve their marketability. One such application of edible dyes is in "sugar plating," that is, the coloring of sugar by dry-mixing with the dye. For these purposes, it is especially desirable that the colorant possess a high tinctorial value in the dry state. In addition, when the composition is intended for use in an aqueous solution, it is often desirable that the colorant be water-soluble. Such is the case, for example, where the colorant is to be used in the preparation of gelatin dessert mixes and the so-called "instant" beverage mixes. Pigments, such as the FD&C lakes, while having a high tinctorial value in dry mixes are substantially insoluble in water and thus are generally unsuitable for such purposes. On the other hand, water-soluble dyes of the prior art, such as the FD&C dyes, have low coloring power in dry mixes and thus fail to impart the desired esthetic appeal to the dry product, unless used in relatively large proportions.

The preparation of water-soluble dyestuffs is well known. Generally, the water-soluble dyes contain one or more water solubilizing groups, such as sulfo or carboxy groups, which are present as, or are convertible to salts. Commonly these dyestuffs are prepared in an aqueous medium from which the dyestuff may be readily separated by the addition of an inorganic salt, such as sodium chloride, which reduces the solubility and "salts out" the dyestuff. By cooling this mixture a crystalline aqueous slurry of the dye is obtained. Concentration of the slurry by such means as filtration or centifugation yields a wet cake of dye, which usually contains about 10 to 90 percent by weight of solids. In such a process, the wet cake is then further purified by washing with a cold, dilute aqueous solution of sodium chloride. In prior art processes the washed cake is then dried, for example, in a vacuum dryer or circulating air dryer, yielding a dry product which is poorly suited for use in coloring dry mixes.

It is an object of the present invention to provide a process for the preparation of water-soluble dyes which have a high tinctorial value in the dry state and which are particularly well-suited for use as colorants in dry blends, powdered, and granulated compositions and the like. Other objects will be obvious from the following description of our invention.

It has now been found that a dye having an exceptionally high tinctorial value in the dry state is obtained when the dye is initimately contacted with an inert low-boiling, water miscible, organic solvent to form a slurry of the dye and the solvent, and then dried, preferably by evaporation. For the purposes of this process, a solvent which boils at a temperature below about 150° C. at atmospheric pressure is considered to be low-boiling.

Surprisingly, the dry state tinctorial strength of water soluble dyes, which have been prepared and then dried in the usual manner, for example, as described above, is markedly improved when the dye is treated with a solvent in accordance with this invention. Thus, according to one aspect of the present invention, dye in substantially dry form is intimately contacted with an inert, low boiling water-miscible organic solvent, and the solvent is removed by evaporation. By dry form is meant that the dye is in a powder or granular state and appears dry to the touch; however, minor amounts of water may be present in the dye, such as results from exposure to the atmosphere.

It has also been found that dyes having a surprisingly high tinctorial value in the dry state are obtained when the dye in the form of an aqueous mixture, containing up to about 90% by weight of water is intimately mixed with solvent and is then dried by evaporation. Accordingly, another aspect of this invention is that dye in the form of an aqueous cake, such as that obtained by concentrating the aqueous slurry of dye during its preparation, which, as described above, contains about 10% to 90% by weight of water is intimately mixed or stirred with a low boiling, water-miscible, inert organic solvent to form a slurry and is then dried by evaporation, preferably at a temperature of about 40° C. to 160° C. This embodiment of the invention has the added advantage in that the usual step of washing the concentrated aqueous dye cakes, which is commonly effected with cold dilute aqueous sodium chloride solution can be substantially reduced or eliminated entirely.

The exact mechanism by which the improvements in dry-state tinctorial value are achieved by the process of the present invention is not known. However, microscopic examination of the products appears to indicate an abundance of the dye in the form of plate-like particles, typically about 0.1 micron thick and about 1 to 3 microns in the other dimensions. These platelets appear to be characterized by a surface which is relatively free from irregularities and which adheres readily to dry solids such as granulated sugar.

The present method of preparing dyestuffs which have improved tinctorial properties in the dry state is applicable to water-soluble dyes and in particular to the water-soluble FD&C colors which may be used in the coloring of granulated products, such as salt, sugar and the like.

The term "water-soluble" as employed herein is intended to include dyes having a solubility of at least about 4 parts of dye per 100 parts of water at 20 degrees centigrade. Suitable dyes include, for example, water-soluble indigoid, azo, azopyrazole and anthraquinone dyes such as:

disodium salt of 5,5'-indigotindisulfonic acid (i.e. FD&C Blue No. 2)
trisodium salt of 3-hydroxy-4-(4-sulfo-1-naphthylazo)-2,7-naphthalenedisulfonic acid. (FD&C Red No. 2)
trisodium salt of 3-carboxy-5-hydroxy-1-(p-sulfophenyl)-4 - (p - sulfophenylazo)pyrazole (i.e. FD&C Yellow No. 5)

disodium salt of 6-hydroxy - 5 - (p - sulfonphenylazo)-2-naphthalenesulfonic acid (i.e. FD&C Yellow No. 6)

disodium salt of 4-hydroxy-3-(5-sulfo - 2,4 - xylylazo)-1-naphthalenesulfonic acid (FD&C Red No. 4)

disodium salt of 4-amino-5-hydroxy - 3 - (p-nitrophenylazo)-6-phenylazo-2,7-naphthalenedisulfonic acid (D&C Black No. 1)

monosodium salt of 4-(p-sulfophenylazo) - 2 - (2,4-xylylazo)-1,3-resorcinol (D&C Brown No. 1)

disodium salt of 1,4-bis(2-sulfo - 4 - toluidino) anthraquinone (D&C Green No. 5)

monosodium salt of 1-hydroxy-4-(2-sulfo - 4 - toluidino) anthraquinone (Ext. D&C Violet No. 2)

disodium salt of 4-(2-sulfo-4-tolylazo) - 3 - hydroxy - 2-naphthoic acid (D&C Red No. 6).

Suitable inert solvents which may be employed in the process of the present invention are low-boiling, completely water-miscible organic solvents. Typical solvents include, for example, methanol, ethanol, n-propanol, isopropanol, tert-butanol, Cellosolve, methyl Cellosolve, acetone and the like. Preferred solvents based on economic consideration as well as effectiveness are the lower alkanols of up to four carbon atoms. Water-immiscible solvents such as benzene, toluene, xylene, n-hexane and the like can be employed in admixture with the required water-miscible solvent. This approach can be employed for example, where the solubility of the dye is impractically high in the usual water-miscible solvents. In such a case a water-immiscible solvent in which the dye is sparingly soluble might be added to reduce the over-all solubility effect.

Most solvents may be employed in substantially anhydrous form or as a water-solvent mixture. However, methanol, the preferred solvent for treating dye in substantially dry, granular condition is most effective when employed in anhydrous form. Acetone, on the other hand, is more effective for treating dry dye when employed in admixture with at least about 1 percent by weight of water. In some instances, such as with commercial grades of ethanol, (95% ethanol-5% water), it is more economical to employ a water solvent mixture such as an azeotropic mixture, than to employ the anhydrous alcohol.

When an aqueous mixture of dye is treated, and also when water-solvent mixtures are used for treating dyes in dry or wet form according to this invention, it is important during the drying, that the water be removed simultaneously with, or prior to the removal of the solvent. Thus, when substantial quantities of water are involved, preferred solvents are those which form azeotropic mixtures with water, or those which have a lower vapor pressure, i.e. higher boiling point, than water. Isopropanol and n-propanol are especially preferred solvents for treating dyes which are in the form of an aqueous mixture.

The amount of solvent used in treating dye according to this invention may vary considerably. For treating dye which is substantially in dry form, generally about 0.5 to 10 parts by weight of solvent per part by weight of dye is employed. When treating an aqueous mixture of dye, about 0.5 to 4.0 parts of solvent, and preferably about 2.0 to 3.0 parts of solvent are used per part of water present in the mixture.

Intimate contact between the dye and solvent may be effected by stirring or mixing with conventional mixing apparatus such as ribbon mixers, paddle mixers, propeller mixers, pug mills, kneaders and the like. The temperature during mixing may vary at least from about room temperature (20° C.) to the reflux temperature of the solvent. Subatmospheric or superatmospheric pressures may be used; however, for convenience, atmospheric pressures are preferred. The amount of time during which the dye and solvent are in contact is not critical and may vary from a few minutes to several hours. In a preferred embodiment of the present invention, about 1.0 to 2.5 parts by weight of solvent per part by weight of substantially dry dye are mechanically mixed at the reflux temperature of the solvent for a period of between about 20 minutes and 20 hours.

The removal of solvent from the solvent-dye mixture is preferably carried out by evaporation at atmospheric pressure, although subatmospheric pressures may be used, if desired. The temperature at which the mixture is dried may vary considerably, for example, temperatures from about 40° to 160° C. at atmospheric pressure are commonly used. Lower temperatures may be employed; however, lower temperatures necessitate correspondingly longer drying times or vacuum conditions and therefore temperatures above about 40° are generally preferred. Similarly, temperatures higher than 160° may be employed, but are not preferred since no advantage is gained. In practice, drying is preferably accomplished by heating the mixture to 95° to 120° C. at atmospheric pressure, until substantially all of the solvent is removed. A particularly preferred drying procedure, according to this invention is to maintain the alcohol-dye mixture at a temperature of about 40° to 60° C. until substantially all of the alcohol is removed and then to increase the temperature to about 95° to 120° C. to complete the drying.

The drying may be carried out in a continuous or batch-wise manner using various types of suitable drying equipment such as tray dryers, tunnel dryers, pan dryers, rotary dryers or the like.

Methanol has been found to be particularly effective in improving the dry state, tinctorial strength of water-soluble dyes treated in substantially dry form. In a preferred embodiment of the present invention a substantially dry, water-soluble dye is intimately contacted with methanol at elevated temperatures, preferably at reflux temperatures, and the methanol is then removed by evaporation.

The following examples describe specific embodiments of our invention and illustrate the best method contemplated for carrying it out; but they are not to be interpreted as limiting the invention to all details thereof, since changes can be made without departing from the scope or spirit of the invention. Parts and percentages are by weight and temperatures are in degrees centigrade.

EXAMPLE 1

A quantity of disodium salt 6-hydroxy-5-(p-sulfophenylazo)-2-naphthalenesulfonic acid (FD&C Yellow No. 6) was screened through a 200 mesh screen (U.S. Standard Sieve Series). A portion of the screened dye was retained as a control, while a second portion, 25 parts, was mixed with 60 parts of methanol and the mixture was heated to reflux. Reflux was maintained for 16 to 20 hours. The mixture was then cooled to room temperature and transferred to an open container, where the methanol was removed by evaporation, first at 55° and then at 110°. The dried dye was again passed through a 200 mesh screen.

A sugar-dye blend was prepared by adding 0.3 part of the dye to 680 parts of granulated sugar and thoroughly blended for 20 minutes in a paddle type mixer. For purposes of comparison a second sugar-dye blend was similarly prepared except that aforementioned untreated (control) dye was employed. The comparative coloring power or "plating" efficiency of the dyes was evaluated in the following manner:

The reflectance of each blend was measured with a Color Eye R, Signature Model D–1 instrument, using BaSO$_4$ as a standard and employing a filter, the peak wave length of which most closely corresponded to the wave length of minimum reflectance of the control sample. The $K/S$ ratios (absorption to scattering coefficients) were computed from the reflectance values in accordance with the method of Kubelka and Munk (Zeitschrift für Technische Physik, vol. 12, 593,601 (1930). The tables of reflectance vs. $K/S$ as set forth in Color in Business, Science and Industry, D. B. Judd, John Wiley and Sons, Inc., New York (1952), pages 358–363, were employed.

The tinctorial strength, i.e. "plating" efficiency, of the methanol-treated dye was calculated according to the formula:

$$\frac{(100)K/S \text{ (Sample)}}{K/S \text{ (Control)}} = \text{percent plating efficiency of the treated sample vs. the control}$$

The plating efficiency of the methanol treated sample was found to be 456% as compared with the untreated control. In other words the degree of coloration imparted to the sugar by the dye prepared by the methanol treatment was 4.56 times that of the untreated dye. Stated another way, if 1 gm. of prior art dye (i.e. the control dye) is used to achieve a certain degree of coloration in a dry mix, less than ¼ gram of the above methanol treated dye is required to achieve the same degree of coloration.

Although the coloring power of the treated and untreated dyes is notably different when used in dry mixes, the coloring power of solution is the same. Thus, when each is placed in solution, for example, 10 gm. of dye per liter of water, the color of each solution is the same.

EXAMPLE 2

The procedure of Example 1 was repeated except that ethyl alcohol (as an azeotropic mixture containing about 4.5 percent by weight of water) was substituted for the methyl alcohol. Evaluation of the dyestuff against an untreated control sample indicated a plating efficiency of 400 percent.

EXAMPLE 3

A sample of FD&C Yellow No. 5 was slurried in water then spray dried and micropulverized to a fine powder, in a hammer-mill type of micropulverizer, through 0.013 inch screen openings. A 25 part portion of the pulverized dye was slurried in about 59 parts of anhydrous ethanol and the mixture heated to refluxing temperature and maintained under refluxing conditions for about 16 hours. The mixture was then dried in air first at 55°, then at 110° until all of the alcohol was removed. The degree of coloration of the ethanol-treated and the untreated portions was measured as in Example 1. The ethanol treated portion was found to have a plating efficiency of 640 percent as compared with the untreated control portion.

EXAMPLES 4–9

In each of the following examples, 25 parts of FD&C Yellow No. 6 dye were mixed with 75 parts of solvent with a paddle type mixer in a reaction vessel fitted with a reflux condenser for 16–20 hours while the temperature was maintained at the boiling point of the solvent. The solvent was then removed by evaporating at 55° for 24 hours and 110° for an additional 24 hours. The dried product was ground less than 200 mesh (U.S. Standard Sieve Series). For comparative evaluation a portion of untreated dye from the same source was similarly ground to less than 200 mesh. The plating efficiency of each solvent treated dye vs. the untreated control dye was evaluated as in Example 1, and the results of such comparisons is shown in Table 1, below.

TABLE 1.—TREATMENT OF FD&C YELLOW NO. 6

| Example No. | Solvent | Plating efficiency [1] |
|---|---|---|
| 4 | Methanol | 456 |
| 5 | Ethanol (denatured with 2% C$_6$H$_6$) | 170 |
| 6 | Ethanol-H$_2$O azeotrope (denatured with 2% C$_6$H$_6$) | 400 |
| 7 | Isopropanol | 248 |
| 8 | n-Propanol | 238 |
| 9 | n-Propanol-H$_2$O azeotrope | 386 |

[1] $\frac{(100) K/S \text{ (Sample)}}{K/S \text{ (Control)}}$

EXAMPLE 10

A mixture of 396 parts of methanol and 100 parts of FD&C Blue No. 2 was charged to a reaction vessel fitted with a reflux condenser and a paddle type stirrer. The mixture was heated to refluxing temperature (65°) and maintained thereat, with continuous stirring, for 18 hours, then cooled over 1½ hours to 30°. The mixture was then poured onto a shallow tray and dried by evaporation in air at 55° for about 16 hours, then at 110° for about 72 hours. The dried product was screened through a 200 mesh screen. For comparison, a portion of the same dye as used in the foregoing procedure was left untreated, except for screening through a 200 mesh screen. The plating efficiency of the solvent-treated dye vs. the untreated control was evaluated as in Example 1. The plating efficiency of the solvent-treated dyestuff was 530 percent.

EXAMPLE 11

A mixture of 1110 parts of methanol and 200 parts of FD&C Red No. 2 was charged to a reaction vessel fitted with a reflux condenser and a paddle type stirrer. The mixture was heated to refluxing temperature (65°) and maintained thereat, with continuous stirring for about 18 hours, then poured on a shallow tray and dried by evaporation in air at 110° to 120° for 20 hours. The dried product was screened through a 200 mesh screen and evaluated against an untreated control sample as in Example 1. The plating efficiency of the methanol-treated dyestuff was 280 percent.

EXAMPLE 12

An aqueous filter cake of commercial grade FD&C Yellow No. 6 was vacuum-dried at 30 degrees for 24 hours, then at 110 degrees at atmospheric pressure for 24 hours. The dried dyestuff was divided into 2 portions. One portion was retained as a control. The second portion (12½ parts) was intimately mixed with 27.6 parts of anhydrous ethanol to form a smooth paste. The alcohol-dye mix was then dried at atmospheric pressure at 55 degrees for 24 hours to remove the alcohol. The dried dye was passed through a 200 mesh screen (U.S. Standard Sieve Series) and blended with granulated sugar as in Example 1. The control portion was similarly screened and blended with granulated sugar. Evaluation of the alcohol-treated dyestuff against the untreated control as described in Example 1 indicated a plating efficiency of 142 percent.

EXAMPLE 13

Fifty parts of an aqueous filter cake which was obtained directly after filtration from the mother liquor and which contained about 46.5 percent by weight of the disodium salt of 6-hydroxy-5-(p-sulfophenylazo)-2-naphthalenesulfonic acid (FD&C Yellow No. 6), mostly as solids, and about 3 percent by weight sodium chloride and about 50.5 percent by weight of water was intimately mixed with 65 parts of isopropanol. The mixture was spread on a flat tray and oven-dried in air at an oven temperature of about 55 degrees for about 24 hours, then at about 100 degrees for an additional 24 hours to yield a dry bright orange powder containing no measureable amount of moisture.

The FD&C Yellow No. 6 dye, thus prepared, was screened through a 200 mesh screen (U.S. Standard Sieve Series). A mixture of 0.3 part of the dye and 680 parts of granulated sugar was thoroughly blended for 20 minutes in a paddle-type mixer.

For purposes of comparison, a second sugar-dye blend was prepared, following the same screening and blending procedures, except that conventional FD&C Yellow No. 6, which had been dried without the addition of alcohol, was employed. The two blends were compared by pouring small portions of each onto a white filter paper and examining visually. The degree of coloration of the sugar-dye blend containing dye which had been dried in mixture with isopropanol as described above was found to be considerably greater than that of the sugar-dye blend prepared from the conventionally dried dye. The plating efficiency as described in Example 1, but based on visual estimation of reflectance was determined to be 280%.

EXAMPLE 14

The procedure of Example 13 was repeated except that in place of the isopropanol there was substituted 65 parts of ethanol (as an azeotropic mixture containing about 4.5 percent by weight of water). The dried dye was screened and blended with granulated sugar as in Example 1. The resultant sugar-dye blend was found to exhibit substantially the same degree of coloration as that prepared with isopropanol in accordance with Example 13 and was markedly superior in color to the sugar-dye blend prepared from conventionally dried dye. The plating efficiency as described in Example 1, but based on visual estimation of reflectance was found to be 280%.

EXAMPLES 15–33

Aqueous mixtures of dyes were combined with solvents as in Examples 13 and 14 varying the dye, porportion and type of solvent and drying conditions as shown. The sugar-dye blends were prepared by screening the dried dye through a 200 mesh screen and blending as in Examples 13 and 14. The reflectance of each blend was measured by a Color Eye Signature Model D–1 instrument, and the plating efficiency calculated according to the formula:

$$\frac{(100)K/S \text{ (Sample)}}{(K/S \text{ Control})}$$

as described in Example 1, except as otherwise noted, wherein the reflectance was estimated visually. The control for each example was a sample of the same dye which had been given identical treatment except for the omission of the step of mixing the dye with an organic solvent, as illustrated by control Examples 15 and 16. The results are set forth in Table 2.

degrees under a pressure of about 20 inches of mercury for about 16 hours. Evaluation of the dyestuff against an untreated control sample indicated a plating efficiency of 274 percent.

It will be apparent to those skilled in the art that many variations and modifications of the invention as hereinabove set forth may be made without departing from the spirit and scope of the invention.

We claim:

1. A method for improving the dry state tinctorial strength of a water-soluble dye containing substituents selected from sulfo- and carboxy-groups which comprises intimately contacting the dye with an inert, low boiling, water-miscible organic solvent to form a slurry of the dye and said solvent and drying said dye by evaporation.

2. A method as defined in claim 1 wherein the dye is dried by heating said slurry to a temperature of about 40° to 160° C.

3. A method as defined in claim 1 wherein the solvent is a lower alkanol.

4. A method as defined in claim 3 wherein the dye is dried by heating said slurry to a temperature of about 40° to 60° C. until substantially all of said lower alkanol is evaporated and then heating the residue to a temperature of about 90° to 120° C.

5. A method as defined in claim 1 wherein said dye is selected from the group consisting of FD&C Blue No. 2, FD&C Red No. 2, FD&C Yellow No. 5, and FD&C Yellow No. 6.

6. A method as defined in claim 1 wherein said dye is in substantially dry, granular form.

7. A method as defined in claim 6 wherein an amount of about 0.5 to 10 parts of said solvent per part of said dye is contacted with said dye to form a slurry.

TABLE 2

| Ex. No. | Dye (parts by wt.) FD&C Yellow No. 5 (60% by wt. H₂O, 2.3% by wt. NaCl) | Dye (parts by wt.) FD&C Yellow No. 6 (50% by wt. H₂O, 3% by wt. NaCl) | Solvent (parts by wt.) Ethanol | Solvent (parts by wt.) n-propanol | Solvent (parts by wt.) isopropanol | Solvent (parts by wt.) Cellosolve | Drying conditions Oven temp., °C. | Drying conditions Pressure | Drying conditions Time, hrs. | Plating efficiency [1] |
|---|---|---|---|---|---|---|---|---|---|---|
| 15 | | 50 | | | | | 100 | Atmospheric | 24 | 100 |
| 16 | 50 | | | | | | 55 / 100 | Atmospheric / Atmospheric | 24 / 24 | 100 |
| 17 | | 50 | | | 65 | | 55 / 100 | Atmospheric / Atmospheric | 24 / 24 | 320 |
| 18 | | 50 | | | 65 | | 100 | Atmospheric | 24 | 635 |
| 19 | | 50 | | | | 65 | 55 / 100 | Atmospheric / Atmospheric | 24 / 24 | [2] 280 |
| 20 | | 50 | 65 | | | | 55 / 100 | Atmospheric / Atmospheric | 24 / 24 | [2] 280 |
| 21 | 17 | | | | 25.6 | | 30 / 100 | 7–10 mm. Hg / Atmospheric | 24 / 24 | 240 |
| 22 | 17 | | | | 25.6 | | 55 / 100 | Atmospheric / Atmospheric | 24 / 24 | 255 |
| 23 | 17 | | | | 25.6 | | 100 | Atmospheric | 24 | 263 |
| 24 | | 50 | | | | 10.2 | 100 | Atmospheric | 24 | [2] 400 |
| 25 | | 50 | | | | 10.2 | 30 / 100 | 7–10 mm. Hg / Atmospheric | 96 / 72 | [2] 400 |
| 26 | | 50 | | 52 | | | 100 | Atmospheric | 24 | 482 |
| 27 | | 50 | | 52 | | | 55 / 100 | Atmospheric / Atmospheric | 24 / 24 | 325 |
| 28 | | 50 | | 26 | | | 55 / 100 | Atmospheric / Atmospheric | 24 / 24 | 252 |
| 29 | | 50 | | 13 | | | 55 / 100 | Atmospheric / Atmospheric | 24 / 24 | 203 |
| 30 | | 50 | | | 39 | | 55 / 100 | Atmospheric / Atmospheric | 24 / 24 | [2] 200 |
| 31 | | 50 | 39 | | | | 55 / 100 | Atmospheric / Atmospheric | 24 / 24 | [2] 200 |
| 32 | | 50 | | 26 | | | 100 | Atmospheric | 24 | 194 |
| 33 | | 50 | | 39 | | | 55 / 100 | Atmospheric / Atmospheric | 24 / 24 | 308 |

[1] Based on formula: $\frac{(100) K/S \text{ (Sample)}}{K/S \text{ (Control)}}$

[2] Estimated visually.

EXAMPLE 34

A slurry of 70 parts FD&C Red No. 3 at room temperature, in 52 parts of toluene and 24 parts of commercial grade ethyl alcohol (Formula 2B Alcohol) was mixed until the dyestuff became noticeably redder and the slurry thickened. An additional 43 parts of toluene was added and the mixture was filtered to remove most of the solvent. The filter-cake was dried at about 70

8. A method as defined in claim 6 wherein said solvent is an alkanol of 1 to 4 carbon atoms.

9. A method defined in claim 8 wherein said dye is refluxed with said solvent.

10. A method according to claim 6 where said solvent is methanol.

11. A method as defined in claim 6 wherein said dye is selected from the group consisting of FD&C Blue No. 2, FD&C Red No. 2, FD&C Yellow No. 5, and FD&C Yellow No. 6 and wherein said dye is refluxed with methanol in an amount of about 0.5 to 10 parts of methanol per part of said dye, and wherein said dye is then dried by evaporation of said methanol at a temperature of about 40° to 160° C.

12. A method as defined in claim 1 wherein said dye is in the form of an aqueous mixture containing up to about 90% by weight of water.

13. A method as defined in claim 12 wherein said dye is contacted with about 0.5 to 4.0 parts of said solvent per part of water present in said aqueous mixture of dye.

14. A method as defined in claim 12 wherein said solvent is selected from the group which consists of ethanol, isopropanol, n-propanol and 2-ethoxyethanol.

15. A water-soluble dye having high tinctorial value in the dry state prepared according to the process of claim 1, said dye containing dye platelets about 0.1 micron in thickness and about 1 to 3 microns in width and in length which have a surface relatively free from irregularities.

References Cited
UNITED STATES PATENTS

| | | | |
|---|---|---|---|
| 2,124,590 | 7/1938 | Reed | 260—208(X) |
| 2,564,225 | 8/1951 | Mayers | 260—208(X) |

FOREIGN PATENTS

| | | | |
|---|---|---|---|
| 503,666 | 4/1939 | Great Britain | 260—208 |

CHARLES B. PARKER, Primary Examiner

C. F. WARREN, Assistant Examiner

U.S. Cl. X.R.

99—148; 260—195, 200, 208, 323, 373, 374, 707